Dec. 22, 1964  P. G. LINDBERG  3,162,098
FLUID ACTUATOR
Filed May 10, 1962
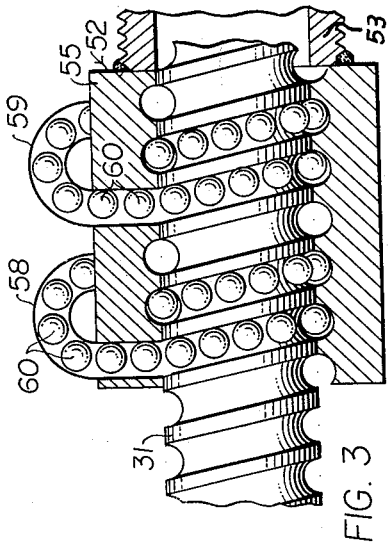
FIG. 3
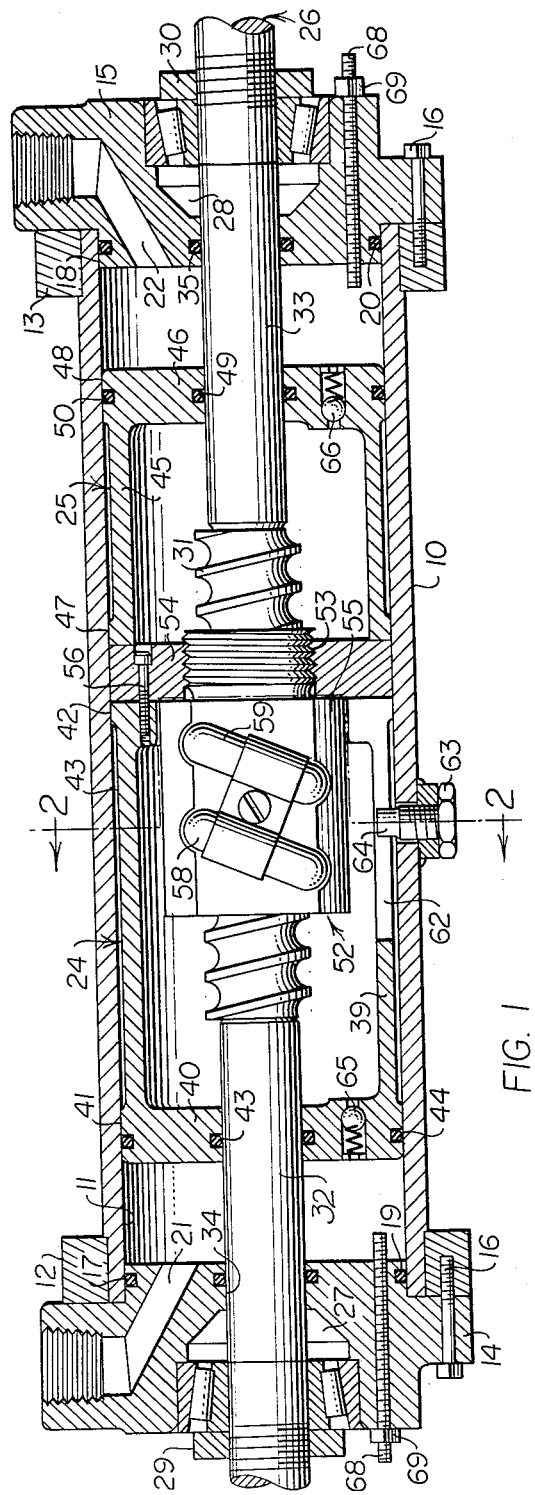
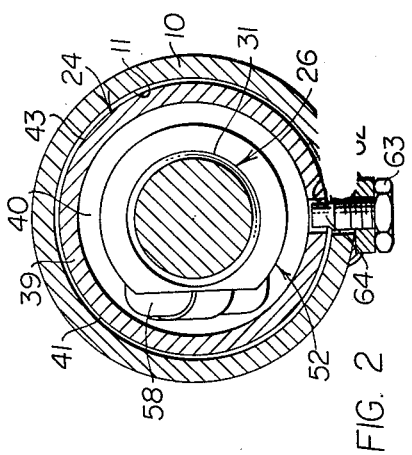
FIG. 2
INVENTOR.
PAUL G. LINDBERG
BY
Williams, Tilberry & Golrick
Attorneys United States Patent Office 3,162,098
Patented Dec. 22, 1964

3,162,098
FLUID ACTUATOR
Paul G. Lindberg, Willoughby, Ohio; Arla V. Lindberg, administratrix of said Paul G. Lindberg, deceased
Filed May 10, 1962, Ser. No. 193,727
4 Claims. (Cl. 92—13)

This invention relates to fluid actuators and more particularly to a novel and improved mechanism for utilizing fluid pressure to obtain rotary motion of a shaft.

There are many applications for mechanisms which utilize fluid pressure to obtain rotary motion. As one example, it is often desirable to control the positioning of a flow-control valve with a mechanical actuator. An actuator which utilizes fluid pressure to obtain rotary motion is ideal for this purpose. Hydraulic actuators of this type afford infinite speed adjustment between a maximum and minimum speed of the mechanism. When properly designed, these mechanisms can be shifted to any position intermediate the extremes of travel and held there indefinitely.

With this invention, a double-ended piston is carried in a hydraulic cylinder. A rotatable shaft is journaled at opposite ends of the cylinder and projects axially through it and through the piston. The shaft has a central screw portion which coacts with a nut secured to the piston. As the piston is reciprocated back and forth in the cylinder, the coaction of the nut and screw converts this reciprocal motion to alternate rotary motion. The piston is keyed to the cylinder to prevent relative rotation between the two and thereby cause all relative rotation to be between the nut and its connected parts and the screw.

Accordingly, one of the principal objects of the invention is to provide a novel and improved actuator for utilizing fluid pressure to obtain rotary motion of a shaft.

A general object of the invention is to provide a mechanism which permits a large amount of rotation to be obtained at high speeds and with substantial torque.

Another general object of this invention is to provide a rotary actuator which has infinite speed adjustment and rotational adjustment within the speed and rotational range of the mechanism.

A further general object of this invention is the provision of a rotary actuator which can be stopped at any place within its range of adjustment and held there substantially indefinitely.

Another object of the invention is to provide such fluid actuator in which shaft and cylinder members are provided. A piston is reciprocally carried in the cylinder, and in which the piston is connected to one of the members to prevent relative rotation therebetween and screw connected to the other of the members to cause relative rotation therebetween upon reciprocation of the piston relative to the two members.

An additional object of the invention is to provide a novel and improved fluid actuator made in accordance with the preceding object in which a ball nut is utilized to provide an efficient low-friction unit.

A further object of the invention is to provide a double-ended piston with seals at either end interposed between the piston and the cylinder and shaft respectively and with a nut secured to the piston intermediate the seals and coacting with a screw portion on the shaft which is also intermediate the seals.

Still another object of the invention is to provide a novel and improved double-ended piston which is made in two cup-shaped sections with the nut secured to one of the sections by a flange means which is interposed between the sections.

A still further object of the invention is to provide a novel and improved double-ended piston made in accordance with the preceding objects in which each end face of the piston has a unidirectional, ball-type check valve therein permitting fluid under pressure to flow from the space between the pressure faces outwardly, only.

Other objects and a fuller understanding of the invention may be had by referring to the following description and claims taken in conjunction with the accompanying drawings, in which:

FIGURE 1 is a sectional view of the device as seen from an axial plane of cross section;

FIGURE 2 is a sectional view of the mechanism as seen from the plane indicated by the line 2—2 of FIGURE 1; and FIGURE 3 is an enlarged sectional view of the ball nut and a part of the shaft screw portion.

Referring now to the drawings, a tube 10 is provided. Tube 10 has cylindrically contoured internal walls 11 which define a pressure chamber. A pair of annular connecting rings 12, 13 are suitably fixed to the opposite ends of the tube 10. End caps 14, 15 are removably connected as by bolts 16 to the rings 12, 13 respectively. The tube 10 together with the end connecting rings 12, 13 and the end caps 14, 15 provides a housing for the actuator assembly.

The end caps 14, 15 include reduced diameter portions 17, 18 which project into the interior of the tube 10. The reduced diameter portions 17, 18 carry, respectively, O-rings 19, 20. The O-rings are respectively interposed between the end caps 14, 15 and the tube 10 to form fluid-tight seals between each of the caps and the tube. The end caps 14, 15 include ports 21, 22 respectively for conducting hydraulic fluid to and from the pressure chamber.

A double-ended piston composed of large and small sections 24, 25 is provided. The piston sections 24, 25 are disposed within the pressure chamber for reciprocal movement. The piston will be described in greater detail below.

A shaft 26 projects axially through tube 10, the end caps 14, 15, and the piston sections 24, 25. Tapered roller bearings 27, 28 are carried by the end caps 14, 15 respectively. The bearings 27, 28 journal the shaft 26 for rotation relative to the remainder of the assembly. Thrust washers 29, 30 are threaded onto the opposite ends of the shaft 26 to position the shaft relative to the roller bearings 27, 28 and relative to the remainder of the assembly.

The shaft 26 has a central screw portion 31. The shaft 26 also includes spaced cylindrically contoured sealing portions 32, 33 on either side of the screw portion. The sealing portions 32, 33 project, respectively, through bores 34, 35 in the end caps 14, 15 respectively. Suitable O-ring seals 36, 37 are carried in the bores 34, 35 respectively, and interposed between the caps 14, 15 and the sealing sections 32, 33 to provide fluid-tight sealing between them.

The large piston section 24 includes an annular elongated body portion 39 and a pressure wall in the form of an inwardly directed end flange 40. The large section 24 includes spaced annular end skirts 41, 42 with a recess 43 therebetween. The skirts 41, 42 are in sliding engagement with the tube wall 11 to provide a low-friction, elongated piston.

The left-hand skirt 41, as seen in the drawing, may be considered to be the peripheral extremity of the end flange 40. This end flange 40 carries O-rings 43, 44 at its inner and outer extremities respectively. The O-rings 43, 44 provide fluid-tight seals respectively between the sealing portion 32 of the shaft and the large piston section 24 and between the wall 11 and the large piston section.

The relatively short piston section 25 includes an elongated tubular body portion 45 and an end flange 46 which correspond in function to the body portion 39 and the end flange 40 of the large section 24. Skirts 47, 48 are provided at the periphery of the small section 25 which skirts correspond in construction and function to the skirts 42, 41 respectively. O-rings 49, 50 are respectively interposed between the flange 46 and the sealing portion 33 and between the flange 46 and the wall 11. The O-ring seals cooperate with the flanges to provide spaced pressure walls which divided the pressure chamber into spaced fluid cavities and an actuation cavity between them.

A ball nut is disposed in the actuation cavity and shown generally at 52. This ball nut 52 may be of the type manufactured by the General Motors Corporation under the trademark "Saginaw." The ball nut 52 is secured to an externally threaded end mount 53. An annular mounting ring 54 is threaded onto the mount 53. The ring 54 is jammed against housing 55 of the ball nut 52 to lock the 54 and the ball nut in fixed relative position. The mounting ring 54 is suitably secured to the piston as by bolts 56 (one shown) which connect the ring to the large piston section 24.

In the pictured arrangement, the ball nut 52 is of the type which has a pair of endless races 58, 59. Balls 60, FIGURE 3, are carried in the races for engagement with the screw portion 31 and for endless travel around the races.

The piston sections 24, 25 are elongated to straddle the screw portion 31 and the ball nut 52. The larger portion 24 is longer than the smaller 25 because it projects over and houses the ball nut. The large section 24 must be long enough to reach from the ring 54 over the ball nut 52 to the sealing portion 32 of the shaft 26 when the ball nut is at its right-hand extreme of its travel.

It will be recognized that a single pressure wall rather than spaced pressure walls could be utilized. For example, the right-hand or smaller section 25 may be eliminated completely and the device will be operative. The double pressure wall arrangement is provided to shield the ball nut 52 from the hydraulic fluid and to permit the space within the piston to be packed with a suitable lubricant if that is desired. In that event, it may be desired to fix the piston sections 24, 25 together. With the disclosed arrangement the hydraulic pressure itself is utilized to maintain the two in relative position and abutment.

The body 39 of the large piston section 24 includes an elongated guide groove 62 which parallels the axis of the mechanism. A key 63, in the form of a bolt with a reduced diameter guide end 64, is threaded into the tube 10. The reduced diameter guide end 64 of the key 63 engages the walls of the guide groove 62 to permit relative reciprocation between the piston and the tube 10 while preventing relative rotation between the two.

Unidirectional ball-type check valves 65, 66 are provided in the end flanges 40, 46 respectively. These check valves are provided so that if there is any leakage past the O-rings 43, 44, 49, 50, hydraulic fluid entering actuation cavity in the center of the piston may escape to the non-pressure side of the piston.

Set screws 68 may be threaded into the end caps and locked in position by suitable lock nuts 69. The set screws provide adjustable stops for selectively limiting the extent of piston travel.

Operation

In operation, fluid under pressure may be directed through the port 21 at which time the port 22 will serve as an exhaust port. The fluid passed through the port 21 will enter the pressure cavity defined by the reduced diameter portion 17 of the end cap 14, the face of the flange 40 and the wall 11. The pressure in this cavity will drive the piston to the right as seen in FIGURE 1. Since the coaction of the key 63 and the groove 62 prevents relative rotation of the piston and the housing, it will be a direct rectilinear reciprocation. As the piston shifts to the right, the nut 52 will coact with the screw portion 31. Since bearings 27, 28 prevent lineal movement of the shaft 26 relative to the remainder of the assembly, the shaft 26 will rotate as the ball nut 52 shifts to the right.

The amount of shaft rotation will depend upon the amount of piston travel and the pitch of the screw portion 31. It will be seen that substantially any amount of rotative movement can be obtained by simply lengthening the entire assembly and varying the pitch of the screw. The torque of the rotative movement will also be a function of the pitch of the screw and, of course, of the pressure of the fluid introduced through the port 21.

When the desired amount of rotation of the shaft has been obtained the piston may be stopped at that point in its travel by introducing fluid under pressure through the port 22 to balance the pressure introduced through the port 21. To reverse the rotation and the reciprocation of the piston, all that is required is to make the port 21 the exhaust port and the port 22 the inlet.

While the invention has been described with a great deal of detail, it is believed that it essentially comprises a novel and improved fluid actuator having infinite speed and rotation selection between maximum and minimum levels wherein a housing and a shaft member are fixed against relative longitudinal movement, a piston is carried in the housing, a key is interposed between the piston and one of the members, and a screw is interposed between the piston and the other of the members such that upon lineal shifting of the piston relative to both of the members relative rotation between the members will occur.

Although the invention has been described in its preferred form with a certain degree of particularly, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. A fluid actuator comprising a housing having a cylindrically walled chamber therein, a cylindrical double ended hollow piston disposed in said chamber for axial slidable movement relative thereto, means interposed between said piston and said housing to prevent relative rotation therebetween, said piston defining a pair of spaced pressure cavities between the ends of said piston and the ends of said housing, a shaft having a screw portion intermediate a pair of spaced cylindrical end portions, said shaft extending axially through said housing with said cylindrical end portions extending axially through the ends of said piston and pressure cavities and journaled in the ends of said housing for relative rotation therebetween, said housing having a pair of ports extending therethrough with each port communicating with one of said pressure cavities to transmit pressurized hydraulic fluid into and from said pressure cavities, hydraulic fluid sealing means interposed between said piston and said cylindrical shaft portions for permitting relative rotation therebetween while preventing pressurized hydraulic fluid in said pressure cavities from being emitted into the interior of said piston, a ball nut located in the interior of said piston, said piston including an inwardly extending ball nut mounting member interposed between the ends of said piston and serving to secure said ball nut to said piston and divide the interior of said piston into two portions, said ball nut being in threaded engagement with said intermediate screw portion of said shaft to coact therewith to convert axial slidable movement of said piston into rotational movement of said shaft.

2. A fluid actuator as claimed in claim 1, wherein a quantity of lubricant is contained within the interior of said hollow piston.

3. A fluid actuator as claimed in claim 1, wherein a one way check valve is carried by each end of said double ended piston to permit fluid under pressure to flow from the interior of said piston into said pressure cavities.

4. A fluid actuator as claimed in claim 1, including a pair of adjustable stops each extending into one of said pressure cavities from said housing to limit axial movement of said piston.

References Cited in the file of this patent

UNITED STATES PATENTS

| | | |
|---|---|---|
| 465,009 | Rice | Dec. 15, 1891 |
| 2,360,539 | Ballard | Oct. 17, 1944 |
| 2,394,252 | Myers | Feb. 5, 1946 |
| 2,468,966 | Case | May 3, 1949 |
| 2,770,984 | Loecy | Nov. 20, 1956 |
| 2,824,314 | Davis | Feb. 25, 1958 |
| 2,955,579 | Block | Oct. 10, 1960 |
| 2,986,123 | Augustin | May 30, 1961 |
| 2,987,888 | Crowell | June 13, 1961 |
| 3,075,500 | Mazur et al. | Jan. 29, 1963 |

FOREIGN PATENTS

| | | |
|---|---|---|
| 1,035,513 | Germany | July 31, 1958 |